(12) United States Patent
Klein

(10) Patent No.: US 11,816,503 B2
(45) Date of Patent: *Nov. 14, 2023

(54) DATA STORAGE RESOURCE MANAGEMENT

(71) Applicant: Kioxia Corporation, Tokyo (JP)

(72) Inventor: Yaron Klein, Raanana (IL)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,570

(22) Filed: Jun. 21, 2021

(65) Prior Publication Data

US 2021/0311790 A1 Oct. 7, 2021

Related U.S. Application Data

(63) Continuation of application No. 16/355,588, filed on Mar. 15, 2019, now Pat. No. 11,042,411.

(51) Int. Cl.
*G06F 9/50* (2006.01)
(52) U.S. Cl.
CPC .......... *G06F 9/5016* (2013.01); *G06F 9/5022* (2013.01); *G06F 9/5038* (2013.01)
(58) Field of Classification Search
CPC .............................. G06F 9/5016; G06F 9/5022
(Continued)

(56) References Cited

U.S. PATENT DOCUMENTS 8,225,007 B2 * 7/2012 Watkins ............... G06F 12/0284
710/5
8,234,650 B1 * 7/2012 Eppstein ............... G06F 9/5072
718/100

(Continued)

FOREIGN PATENT DOCUMENTS

JP 2003-296038 A 10/2003
JP 2010-176189 A 8/2010

(Continued)

OTHER PUBLICATIONS

Gelb, Jack P. "System-managed storage." IBM Systems Journal 28.1 (1989): pp. 77-103. (Year: 1989).*

(Continued)

*Primary Examiner* — Satish Rampuria
(74) *Attorney, Agent, or Firm* — Foley & Lardner LLP

(57) ABSTRACT

A resource management system in a data center one or more data storage resource providers and a transaction server. The transaction server is configured to receive, from a client, a request for read and/or write access for a data storage resource, the request comprising one or more specifications, to provide, to the one or more data storage resource providers, at least a portion of the request, and to receive, from the one or more data storage resource providers, respective responses to the request, the responses respectively comprising one or more allocation options. The transaction server is further configured to select one of the one or more allocation options for registration, and register the selected allocation option with a data manager. At least one of the one or more data storage providers is configured to provide the data storage resource in accordance with the registered allocation option.

20 Claims, 7 Drawing Sheets

(58) Field of Classification Search
USPC .................................................... 718/1–108
See application file for complete search history.

(56) References Cited

U.S. PATENT DOCUMENTS

| | | | | |
|---|---|---|---|---|
| 8,429,097 | B1* | 4/2013 | Sivasubramanian | ........................ G06F 16/2282 706/12 |
| 9,311,001 | B1* | 4/2016 | Glade | ................... G06F 3/0665 |
| 9,489,293 | B2* | 11/2016 | Kimmel | ................ G06F 3/0608 |
| 10,635,316 | B2* | 4/2020 | Singh | ................ G06F 9/45558 |
| 2004/0021678 | A1* | 2/2004 | Ullah | .................... G06F 9/5027 715/700 |
| 2016/0344595 | A1* | 11/2016 | Jain | ..................... H04L 41/5025 |
| 2018/0102984 | A1 | 4/2018 | Dettori et al. | |

FOREIGN PATENT DOCUMENTS

| | | |
|---|---|---|
| JP | 2016-507814 A | 3/2016 |
| JP | 2017-182286 A | 10/2017 |

OTHER PUBLICATIONS

Abadie, Lana, et al. "Storage resource managers: Recent international experience on requirements and multiple co-operating implementations." 24th IEEE Conference on Mass Storage Systems and Technologies (MSST 2007). IEEE, 2007.pp. 1-13 (Year: 2007).*

Rashid, Richard, et al. "Machine-independent virtual memory management for paged uniprocessor and multiprocessor architectures." Proceedings of the second international conference on Architectual support for programming languages and operating systems. 1987. pp. 31-39 (Year: 2987).*

Czajkowski, Karl, et al. "Grid information services for distributed resource sharing." Proceedings 10th IEEE International Symposium on High Performance Distributed Computing. IEEE, 2001.pp. 181-194 (Year: 2001).*

Vavilapalli, Vinod Kumar, et al. "Apache hadoop yarn: Yet another resource negotiator." Proceedings of the 4th annual Symposium on Cloud Computing. 2013.pp. 1-16 (Year: 2013).*

Kahn, Clifford E. "A retrospective on the VAX VMM security kernel." IEEE Trans (1991).pp. 1147-1165 (Year: 1991).*

Berger, Stefan, et al. "TVDc: Managing security in the trusted virtual datacenter," ACM SIGOPS Operating Systems Review 42.1 (2008): pp. 40-47.

Garcia et al., "SLA-driven dynamic cloud resource management," Future Generation Computer Systems 31, (2014), pp. 1-11.

Hindman, Benjamin, et al., "Mesas: A platform for fine-grained resource sharing in the data center," NSDI. vol. 11, 2011, pp. 1-14.

Simmons et al., "Dynamic provisioning of resources in data centers," Third International Conference on Autonomic and Autonomous Systems (ICAS'07), IEEE, (2007), pp. 1-7.

Singh, Arjun, et al., "Jupiter rising: A decade of clos topologies and centralized control in google's datacenter network," ACM SIGCOMM computer communication review 45.4 (2015): pp. 183-197.

Son et al., "Negotiation-based flexible SLA establishment with SLA-driven resource allocation in cloud computing," 2013 13th IEEE/ACM International Symposium on Cluster, Cloud, and Grid Computing. IEEE, (2013), pp. 1-4.

Foreign Search Report on PCT PCT/IB2020/052324 dated Sep. 30, 2021; 6 pages.

* cited by examiner

DATA STORAGE RESOURCE MANAGEMENT

CROSS-REFERENCE TO RELATED APPLICATIONS

The present application is a continuation of U.S. application Ser. No. 16/355,588, filed Mar. 15, 2019, now U.S. Pat. No. 11,042,411, the contents of which are incorporated herein by reference in their entirety.

TECHNICAL FIELD

The present disclosure generally relates to systems and methods for managing data resources, such as data storage resources which are located in, or are accessible to, a data center (DC).

BACKGROUND

Some comparative DC management systems implement a central management point with access to DC information and that monitors the DC components and is responsible for DC decisions. Each client request is matched to one or more storage nodes by the central manager. The central manager receives monitoring information and telemetry from components in the system.

Such systems can have certain drawbacks. For example, the central management point may become a bottleneck when scaling into large DCs. Complex requirements such as provisioning multiple media types may be challenging to implement. New media type application specifications may be implemented or requested, and may be desirably addressed by new matching algorithms, which can be challenging to configure. As a result, the overall mapping between clients and storage nodes may not be optimal.

BRIEF DESCRIPTION

In such comparative systems, when a client requests a data storage resource (e.g., a volume or a space for storing data), the client may request that the manager provide one. Such a provisioning request may include a capacity or space specification, and may include other specifications relating to, for example, a Service Level Agreement (SLA) or a Quality of Service (QoS). The central manager may allocate a volume or space in one of the storage nodes according to the specifications, a state of the storage nodes (e.g., available and/or projected capacity) and client information. Following the allocation, the client can read and write from the allocated volume.

Certain complexities can make such provisioning challenging. For example, in a DC, a plurality of clients may be running various applications. A data center may host multiple applications, virtual machines, containers or microservices with different specifications and resources. In some cases, each such application uses a persistent volume to store and process its data. Each application may use different capacity and different storage classes, translating into various storage criteria.

In addition, a data center is a dynamic environment, where application loads may fluctuate. For example, during seasonal events such as "Black Friday," commerce applications may use more storage than usual, and then release it after the event has passed.

DC management can include matching storage volumes to applications such that application specifications are satisfied and resources are utilized in an optimal or improved manner, addressing peak states and steady states. Furthermore, DCs may address scalability as clients and data nodes are added to the data center.

For data centers implementing hard disk drive (HDD) storage, provisioning may be implemented based on capacity and the manager can locate a next available free space. Other media types—such as solid-state drives (SSD) and non-volatile memory express (NVMe), and advances in supply chain management (SCM) may involve more complex provisioning. In addition, applications may demand advanced or complex specifications to address service level specifications. For example, Real Time Bidding applications can involve very strict tail latency requirements, while backup applications may relax performance and can make use of low cost storage. Optimizing data storage resource allocation given such complexities can be challenging.

One or more embodiments described herein address at least these issues. In some embodiments, a DC implements a decentralized approach to data management. In some embodiments, data storage resource providers (e.g. which manage data nodes including, for example, data servers that manage flash memory) may communicate with a client requesting a data storage resource to determine a data storage resource allocation. For example, the client may communicate with one or more data storage resource providers and may select one or more allocation options proposed by, or otherwise corresponding to, one or more of the data storage resource providers to satisfy at least some of the client's data storage resource demands. The communication may be directly between the client and data storage resource providers or may be indirect (e.g., via a transaction server). A DC manager need not be used in such communications (although the DC manager may be involved in some embodiments). For example, a client may submit a data storage resource request, and a protocol exchange may be implemented in which one or more data storage resource providers may respond to the request (e.g. with a proposed or candidate allocation option), and the client (or a transaction server) may select a candidate allocation option. The DC manager need not be involved in those processes. The DC manager may be out-of-band for at least some of those processes. The DC manager may register selected allocation options (which may be referred to herein as a "committed selection"), and may monitor data nodes or data storage resource providers, such as for alarms or alerts, and may notify appropriate parties. The DC manager may provide a data storage resource allowance for the client, and may reduce at least a portion of the allowance to register a committed selection for the client.

In one or more embodiments, according to a first aspect, a resource management system in a data center includes one or more data storage resource providers and a transaction server. The transaction server is configured to receive, from a client, a request for read and/or write access for a data storage resource, the request including one or more specifications that include a space specification, to provide, to the one or more data storage resource providers, at least a portion of the request, and to receive, from the one or more data storage resource providers, respective responses to the request, the responses respectively including one or more allocation options including one or more specifications that include an allowance specification. The transaction server is further configured to select one of the one or more allocation options for registration, and register the selected allocation option with a data manager. At least one of the one or more data storage providers is configured to provide the data storage resource in accordance with the registered allocation option.

In one or more embodiments, according to a second aspect, a data storage resource management system includes a data manager configured to register allocation specifications, and one or more data storage resource providers. Each of the one or more data storage resource providers is configured to: receive, from a client, a request for read and/or write access for a data storage resource managed by the data storage resource provider, the request including one or more specifications that include a space specification; provide, to the client, a response to the request, the response including one or more allocation options including one or more specifications that include an allowance specification; receive, from the data manager, an indication that at least one of the one or more allocation options has been registered, and provide the data storage resource in accordance with the registered allocation option.

In one or more embodiments, according to a third aspect, a method of managing data storage resources includes: transmitting, by a client device to one or more data storage resource providers, a request for read and/or write access for a data storage resource, the request including one or more specifications that include a space specification; receiving, by the client device from the one or more data storage resource providers, a plurality of responses to the request, the responses respectively including one or more allocation options including one or more specifications that include an allowance specification that includes a space specification and an allowance specification that includes an allowance amount; selecting, by the client device, one of the one or more allocation options; registering, by the client device, the selected allocation option with a data manager, and performing a read or write operation to a data storage managed by at least one of the data storage resource providers in accordance with the registered allocation option.

DETAILED DESCRIPTION

Embodiments described herein provide for improved data management (e.g., for a DC) using a decentralized approach. In some embodiments, a client may submit a data storage resource request, and a protocol exchange may occur in which a plurality of data storage resource providers may respond to the request with respective candidate allocation options, and one or more of the candidate allocation option may be selected as a committed selection. A DC manager may manage an allowance of the client. The committed selection may specify an allowance amount, and the DC manager may transfer or remove the allowance amount from the client's allowance. Thus, instead of a system in which a central DC manager manages all or most aspects of data storage resource provisioning, which may cause bottlenecks due to limitations of the DC manager, embodiments described herein provide for specific dynamics between the data storage resource providers and one or more clients that avoid such bottlenecks, and that can readily provision a large number of different applications, virtual machines, containers, or micro-services having different specifications (e.g. involving different capacities, storage classes, quality specifications including SLA or QoS specifications, and other complexities). Some of those specific dynamics include specific requests for provisioning from a client to data storage resource providers, responses from the data storage resource providers including allocation options specifying an allowance amount, selection of those options, registering of those options and accounting for the registration via transferring or reducing a client allowance, and provisioning in accordance with those options.

Figure 1A:
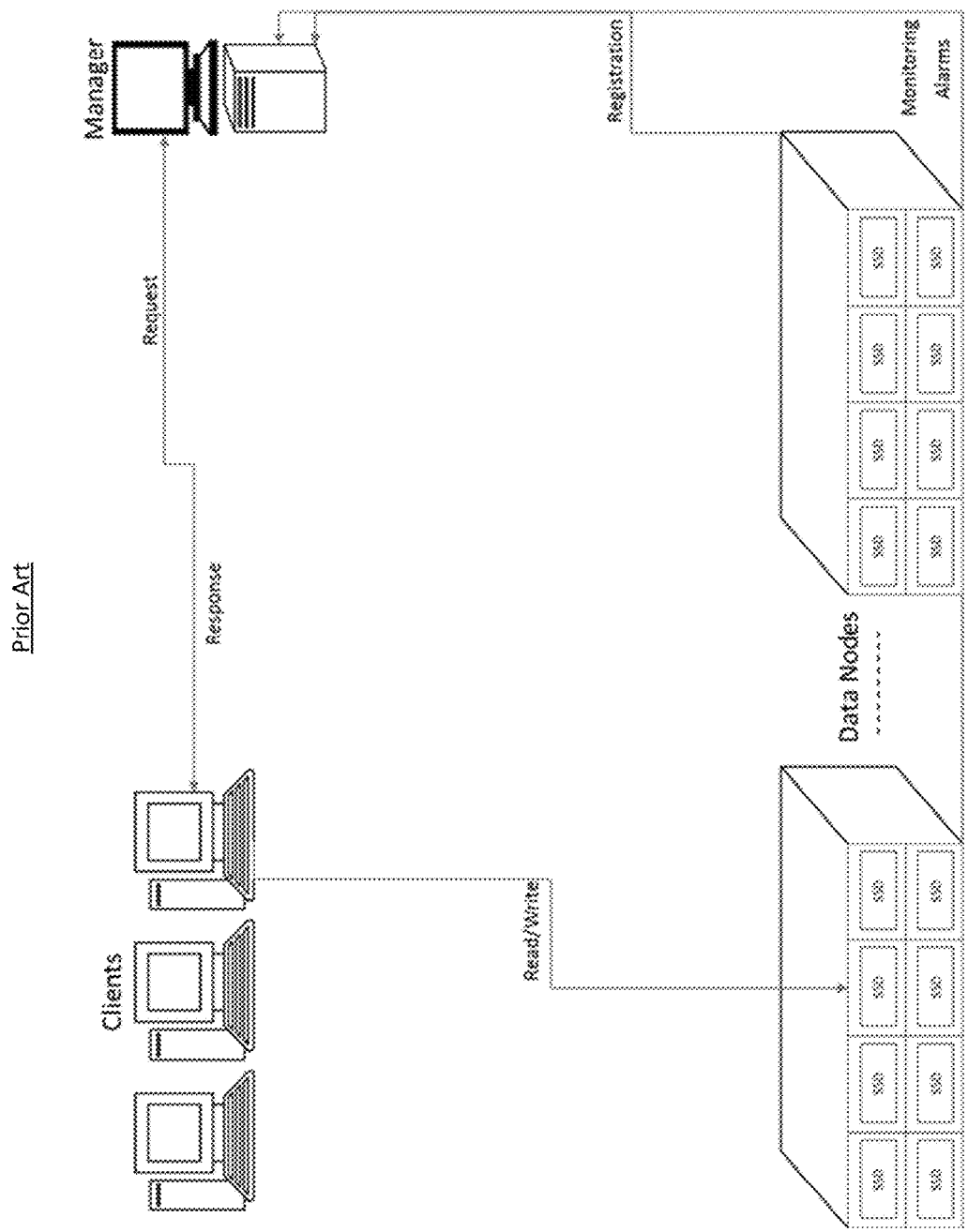
FIG. 1A shows an overview of a comparative data management system.

FIG. 1A shows an overview of a comparative data management system. In FIG. 1A, a plurality of clients are configured to request provisioning from a central DC manager. Data nodes may register themselves with the DC manager when they are installed, commissioned or upgraded, providing the DC Manager with information on their storage attributes and capabilities. The DC manager may receive the request, and may responsively select registered data nodes to fulfill the request. The DC manager may also monitor the data nodes for alarms or problems that may arise. The DC manager may, after selecting data nodes to fulfill the request, respond to the clients to inform them that they have permission to read/write to the selected nodes. Following this, the clients may submit read/write requests to the provisioned data nodes. As discussed above, certain challenges may arise in such a system. For example, bottlenecks may arise due to limitations of the DC manager, and it may be difficult to optimally provision a large number of different client demands for different capacities, storage classes, and quality specifications.

Figure 1B:
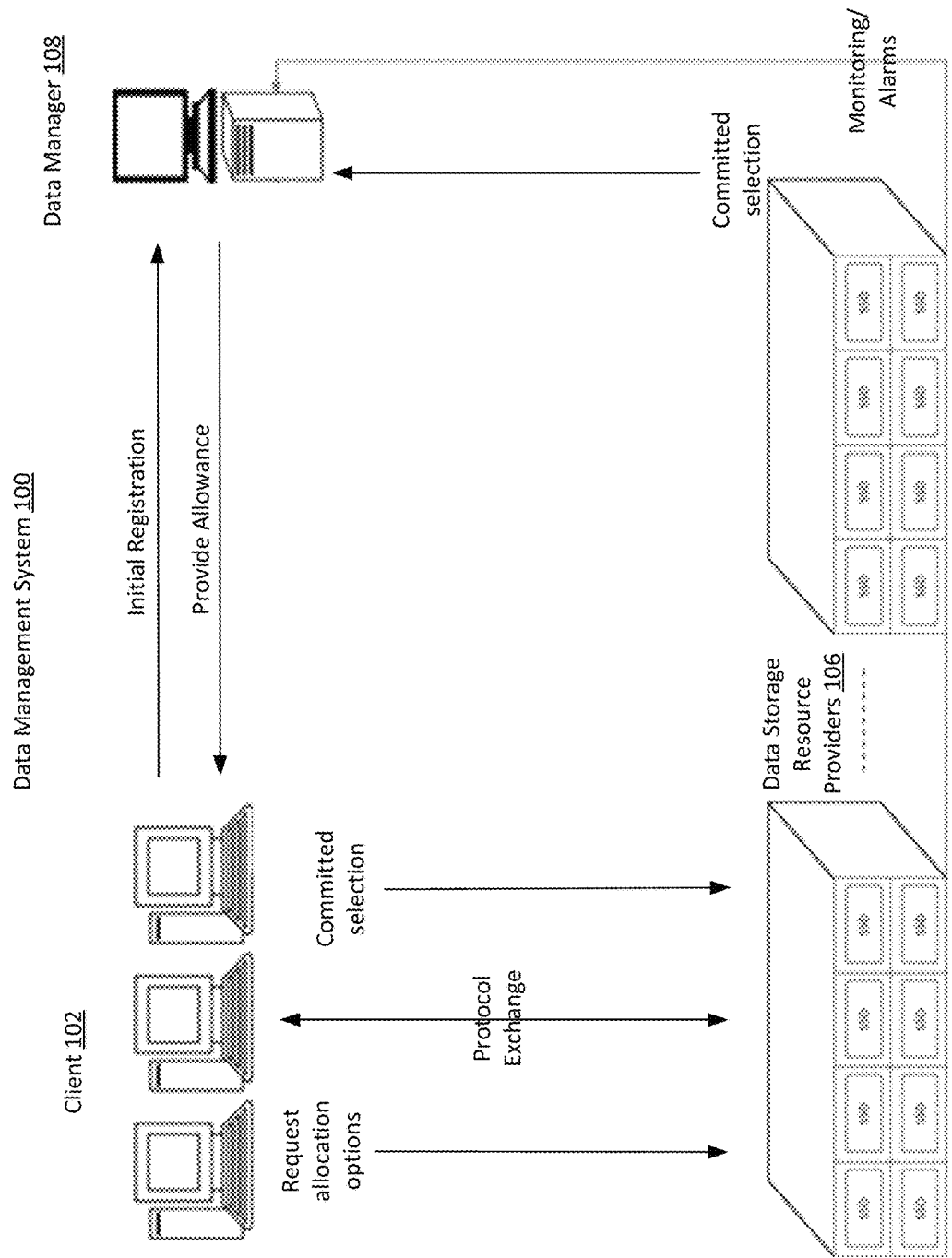
FIG. 1B shows an overview of a data management system according to embodiments of the present disclosure.

FIG. 1B shows an overview of a data management system 100 according to embodiments of the present disclosure. The data management system 100 includes a client 102, data storage resource providers 106, and a data manager 108, discussed in detail below. The data management system 100 may provide for a decentralized approach to data management in which the client 102 may perform an initial registration with the data manager 108, and the data manager 108 may provide or assign an allowance to the client 102. The client 102 may submit a request for allocation options to the data storage resource providers 106, which may be followed by a protocol exchange wherein the data storage resource providers 106 may provide respective responses to the request including one or more candidate allocation options, and one or more of the candidate allocation option may be selected by the client 102 as a committed selection. The data storage resource providers 106 may respond by committing to the selection, and a copy or an indication of the commitment may be sent to the data manager 108 (e.g., by the data storage resource providers 108). The data manager 108 may manage an allowance of the client 102, may register the committed selection, and may transfer or remove the allowance amount from the client's allowance and update the client 102 with the remaining allowance.

Figure 1C:
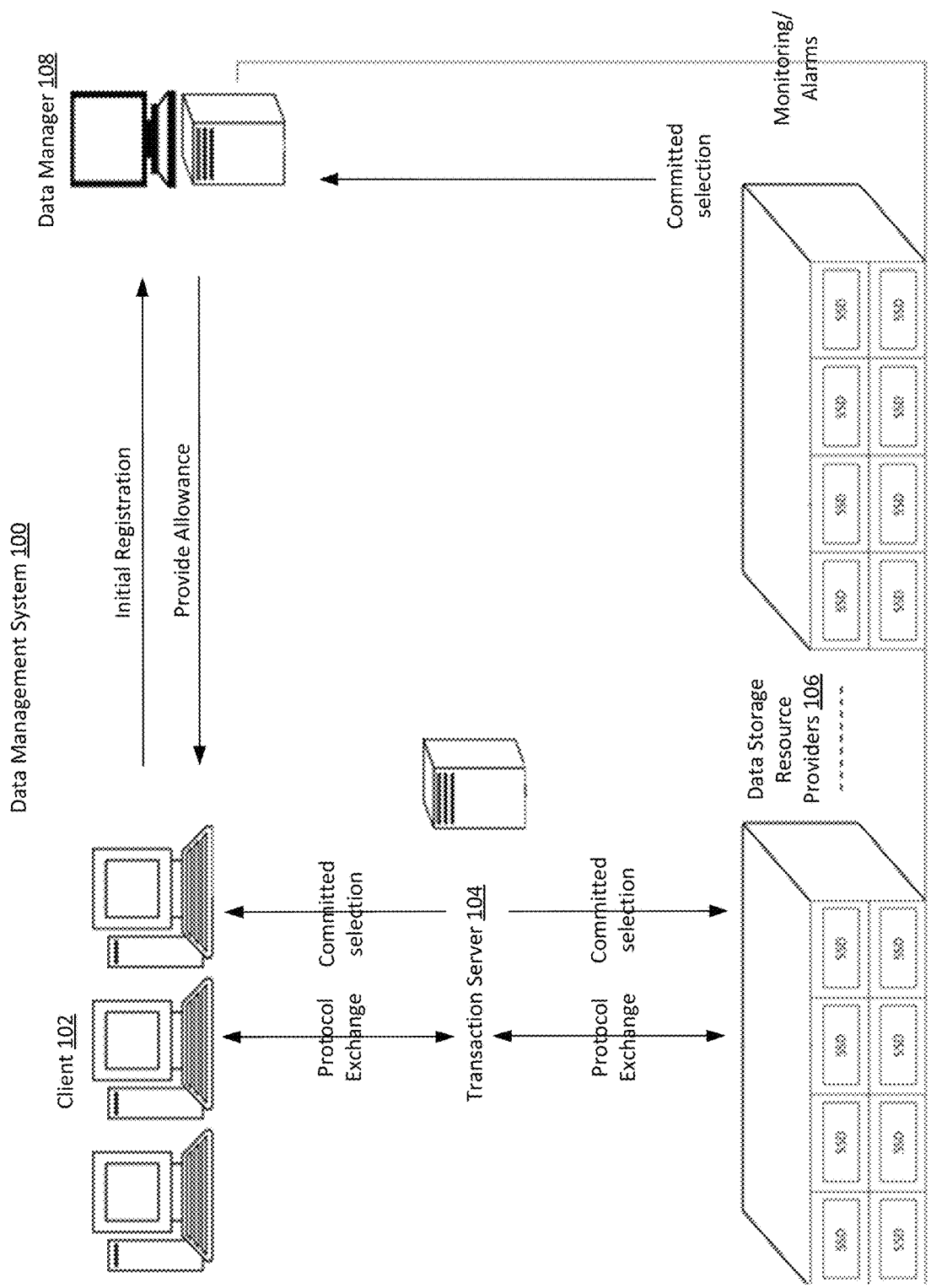
FIG. 1C shows an overview of a data management system that includes a transaction server according to embodiments of the present disclosure.

FIG. 1C shows an overview of a data management system 100 that includes a transaction server 104 (described in detail below) according to embodiments of the present disclosure. The transaction server 104 may provide for communications between the client 102 and the data storage resource providers 106. The transaction server 104 may receive provisioning requests from the client 102, and may transmit the provisioning requests to the data storage resource providers 106. In some embodiments, the data storage resource providers 106 may poll or query the transaction server about provisioning requests, and the transaction server 104 may accordingly provide information about provisioning requests received from the client 102. The data storage resource providers 106 may provide responses (that include allocation options) to the provisioning requests to the transaction server 104. In some embodiments, the transaction server 104 selects allocation options and registers the committed selections with the data manager 108. In some embodiments, the transaction server 104 selects allocation options and informs the data storage resource providers 106, and the data storage resource providers 106 informs the data manager 108 of the committed selection. In some embodiments, the transaction server 104 transmits the responses to the client 102, and the client 102 selects an allocation option and informs the transaction server 104 or the data manager 108 of the committed selection.

Figure 2:
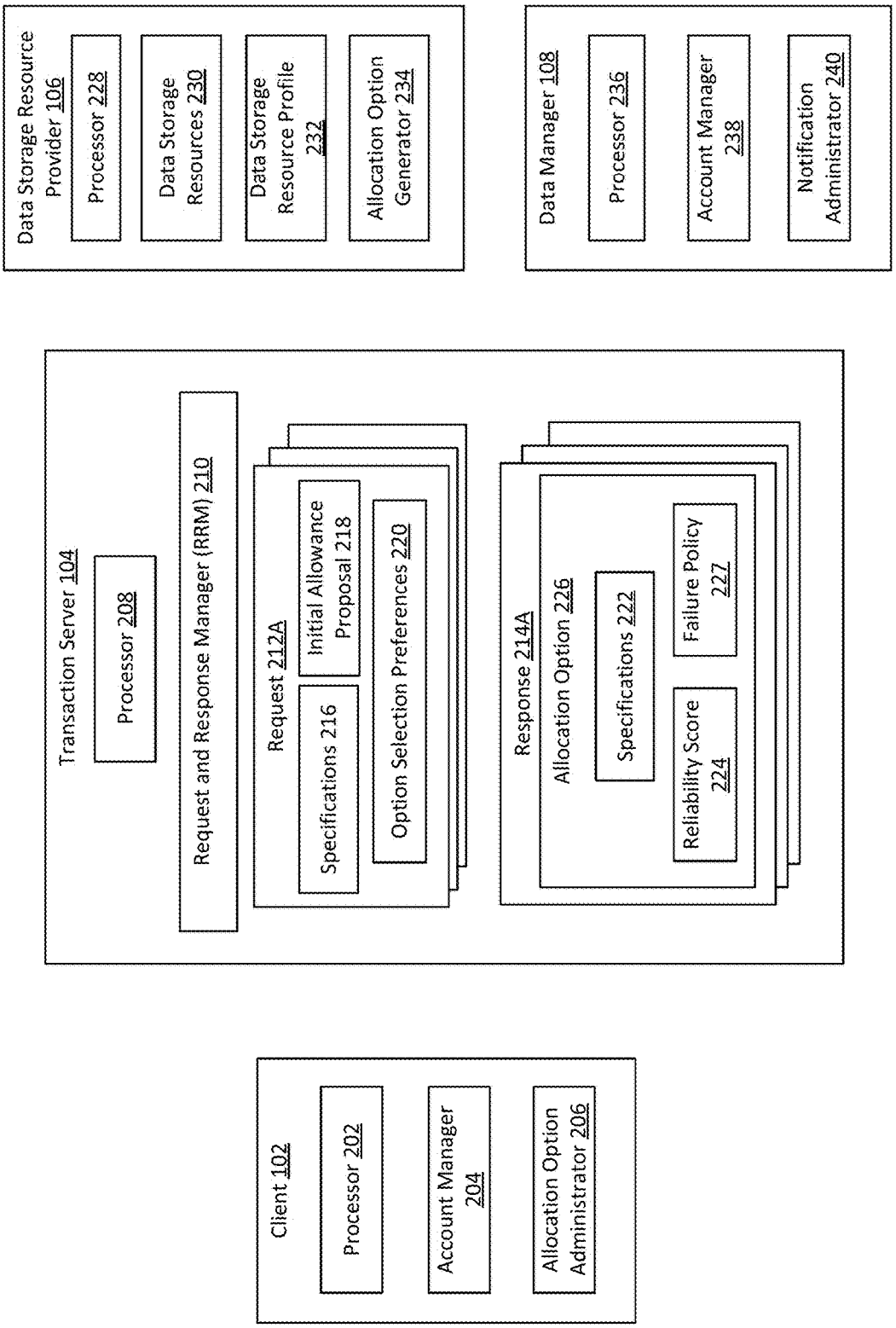
FIG. 2 is a block diagram of a data management system according to embodiments of the present disclosure.

FIG. 2 is a block diagram of a data management system 100 according to embodiments of the present disclosure. The data management system 100 can include one or more clients 102, a transaction server 104, one or more data storage resource providers 106, and a data manager 108. The one or more clients 102, the transaction server 104, the one or more data storage resource providers 106, and the data manager 108 can be communicatively connected (e.g. via a DC private network). The data management system 100 can correspond to one or more DCs, and can provide for a decentralized data management approach as described herein.

The one or more clients 102 can include one or more client devices, or can represent one or more client devices seeking data storage resources. The one or more clients 102 may be referred to herein in the singular for convenience. The client 102 can include hosts, servers or other devices configured to transmit data for storage or for processing. The client 102 may include a processor 202, an account manager 204, and an allocation administrator 206. The processor 202 may include one or more microprocessors, application-specific integrated circuits (ASICs), a field-programmable gate array (FPGA), etc., or combinations thereof. The processor 202 may be configured to execute firmware, software, and instructions stored in memory (on machine-readable media), such as instructions included in, or accessible to, the components of the client 102 described herein.

The account manager 204 may include logic, hardware, or firmware for communicating with the data manager 108 about a client account managed by the data manager 108. The client account may include an allowance for data storage resources of, or managed by, the data management system 100. The account manager 204 may request that the data manager 108 generate or register the client account, may request an initial allowance for the client account, and may request an increase or other adjustment in the allowance of the client account. For example, the account manager 204 may execute or participate in a purchase of the allowance, or of an increase in the allowance. The purchase may be executed according to an agreement with the data manager 108.

The account manager 204 may provide for a user interface (e.g., a graphical user interface (GUI)) for managing the client account. For example, a user of the account manager 204 may use the GUI to log in to or access the client account, which may include submitting log in credentials. The GUI can be used to submit requests to the data manager 108 for an adjustment to the allowance. The GUI can be used to manage allocation specifications 216. The GUI can be used to review and/or select allocation options 226.

The allocation administrator 206 may include logic, hardware, or firmware for managing provisioning requests and for managing selection of allocation options 226, and/or for implementing a protocol exchange. The allocation administrator 206 may access, set, or otherwise manage allocation specifications 216 for the client 102 or for a client account accessed by the client 102. For example, the allocation specifications 216 may be set using the GUI. The allocation specifications 216 may include a variety of specifications. For example, the allocation specifications 216 may include a space specification that specifies a desired, preferred, or required data storage space (e.g. an amount of memory, such as flash memory). The space specification may include storage specifications including, for example, capacity, Input/Output operations per second (Iops), bandwidth, latency, tail latency, endurance (retention guarantees, Drive Writes Per Day (DWPD)) and redundancy for reliability (e.g., RAID, data mirroring and replication and erasure coding).

The above-described space specification may be for a first data storage space, and the space specification may also specify a second (e.g., back up) desired, preferred, or required data storage space, which may be used as a secondary option when the first data storage space is not available. The space specification may specify additional desired, preferred, or required data storage space. The data storage spaces may be ranked or ordered or otherwise prioritized (e.g. with a highest ranked data storage space being sought first, and then a next ranked data storage space, and so on). Generally speaking, the specifications described herein including the allocation specifications 216 and specifications 222 (described below) may include such back-up options (which can be implemented, for example, when a first option cannot or will not be implemented, or is difficult to implement).

The allocation specifications 216 can include an allowance specification including an initial allowance proposal 218. The initial allowance proposal 218 may specify an allowance quantity that the client 102 is willing to transfer, have deducted, or otherwise give up from the client account in exchange for provision of data storage resources (e.g. data storage resources satisfying other specifications of the allocation specifications). The initial allowance proposal 218 may be a required allowance amount, and only allocation options 226 matching the required allowance amount (e.g. provisioning data storage resources for the required allowance amount or for an allowance amount greater than the required allowance amount) may be acceptable matches for such an allowance specification. The initial allowance proposal 218 may be a starting point or an input into a matching process that matches the allocation specifications 216 and an allocation option 226, and the allowance specifications 216 may indicate that the initial allowance proposal 218 is not a hard requirement. For example, the allowance specifications 216 may indicate that the initial allowance proposal 218 is to be used in an initial request for provisioning. The allowance specifications 216 may indicate a range of acceptable allowance amounts (e.g., may specify a minimum acceptable allowance amount) for a matching allocation option 226.

The allocation administrator 206 may determine the initial allowance proposal 218 based on an available allowance (e.g., an allowance included in the client account). For example, the allocation administrator 206 may determine the initial allowance proposal to be an increasing function (e.g., a monotonically increasing function) of available allowance. Thus, the higher the available allowance, the higher the initial allowance proposal 218 may be.

The allowance specifications 216 may include one or more quality specifications. For example, the quality specification may include an SLA, or a QoS specification. The quality specifications may include a first preferred quality specification, and may include a second (e.g., back-up) quality specification. In some embodiments, the first quality specification may be associated with a first allowance amount, and a second quality specification may be associated with a second allowance amount. The second quality specification may be lower than the first quality specification, and the second allowance amount may be lower than the first allowance amount. The associated first quality specification and first allowance amount may be included in a preferred provisioning, and the associated second quality specification and second allowance amount may be included in a back-up provisioning, both provisioning being included in a provisioning request. The data system 100 may determine whether the preferred provisioning can be satisfied, and if not, may determine whether the back-up provisioning can be satisfied.

The allocation specifications 216 may include timing specifications. For example, the timing specifications may be associated with other specifications and may include a validity time frame specifying one or more time periods during which the other specifications are valid, in effect, or demanded. The timing specification may include an expiration time specifying one or more time periods during which the other specifications are no longer valid, in effect, or demanded. Thus, the timing specifications can set a time limit on other specifications (e.g., can specify a period of validity), or can provide for implementing particular specifications at a particular timing (e.g., seasonally to coincide with holidays or seasonal events such as Black Friday, Cyber Monday, etc., which may involve a greater data storage demand)).

The allocation administrator 206 may use the allocation specifications 216 to generate provisioning requests 212, and may transmit the requests 212 to the transaction server 104. In some embodiments that omit a transaction server 104, the allocation administrator 206 may transmit the requests 212 to one or more data storage resource providers 106. The requests 212 may include any of the specifications included in the allocation specifications 216. The request 212 may be generated and transmitted responsive to a request received via a GUI provided by the account manager 204 to a user of the client 102.

The allocation administrator 206 may select allocation options 226 provided by the data storage providers 106 (e.g., via the transaction server 104) based on the allocation specifications 216. In other embodiments, the transaction server 104 may select the allocation options 226, and may notify the client 102 of the selection and/or registration of the selected allocation options 226.

For example, the allocation administrator 206 may receive responses 214 to a provisioning request 212 from the data storage resource providers 106 including allocation options 226, and the allocation administrator 206 may select an allocation option 226 in accordance with the allocation specifications 216. In some embodiments, the allocation administrator 206 selects an allocation option 226 (e.g. that satisfies a minimum space specification) having a lowest allowance amount of the allocation options 226 (e.g. that satisfy the minimum space specification). In some embodiments, the allocation administrator 206 may select multiple allocation options 226 to fulfill a provisioning request 212 (e.g., a single provisioning request). The allocation administrator 206 may select multiple allocation options 226 so as to minimize a total allowance amount, to maximize quality, or to strike a balance therebetween.

For example, the allocation administrator 206 may optionally perform an initial filtering operation on allocation options 226 included in received responses 214 to the provisioning request 212 to filter out allocation options 226 that do not meet a minimum quality specification (in some embodiments, the data storage resource providers 106 may be configured to only send allocation options 226 that meet a minimum quality specified in the provision request 212, and such filtering by the client 102 may be omitted). The allocation administrator 206 may determine a space-to-allowance ratio for each of the (remaining) allocation options 226 being considered. The allocation administrator 206 may fill the space specification using allocation options 226 having the highest space-to-allowance ratios (e.g., may select a first allocation option 226 having a highest space-to-allowance ratio, may determine whether more space demand remains to be fulfilled, may select a second allocation option 226 having a next highest space-to-allowance ratio, and so on, until the space specification is fulfilled).

In some embodiments, the responses 214 to the provisioning request received from the data storage resource storage providers 106 may include failure policies 226 specifying that a back-up allocation option 226 is to be used under certain conditions. For example, a response 214 may include a first set of specifications 222 (e.g., including a first higher quality specification and a first higher allowance amount) and a second set of specifications 222 (e.g., including a second lower quality specification and a second lower allowance amount), and a failure policy 227 specifying that if provisioning matching the first set of specifications 216 cannot or will not be provided, provisioning matching the second set of specifications 216 may be provided instead. The failure policy 227 may also specify a manner of implementing both sets specifications 222. For example, if failure to meet the first set of specifications 222 occurs partway through a provisioning period specified by a timing specification, a total allowance amount for the provisioning may be determined to be a sum of (i) the first allowance amount pro-rated for a period during which provisioning matching the first set of specifications was provided, and (ii) the second allowance amount pro-rated for a period during which provisioning matching the second set of specifications was provided. The failure policy 227 may also specify a reduction (e.g., a fixed reduction or a reduction proportionate to a period in which the first set of specifications 222 were not met, relative to a total period of the allocation option) that applies should the first set of specifications 222 not be met for the total period of the allocation option 226.

The allocation administrator 206 may also determine option selection preferences 220 for selecting allocation options 226, and may transmit the option selection preferences 220 to the transaction server 104. The option selection preferences 220 may include, for example, reliability preferences regarding reliability of an allocation option 226. The reliability of an allocation option 226 may be reflected in a reliability score 224 (e.g., a score determined by the allocation administrator 206, by the transaction server 104, or by the data manager 108), and the reliability preferences may include a preference for a high reliability score 224 (e.g., above a threshold). The reliability may be based on, for example, a historical reliability of a particular data storage resource provider 106 proposing the allocation option 226 or of a reliability of one or more data nodes to be used to fulfill provisioning of the allocation option 226, or based on a self-assessment of the data storage resource providers 106 as to reliability (e.g., of the particular proposed allocation option 226). The option selection preferences 220 may also indicate a weighting for an allowance amount of the allocation option 226 based on the reliability score 224 (e.g., the weight being determined based on a function of the reliability score 224, wherein a lower reliability score 224 results in a higher weight being applied to the allowance amount). The option selection preferences 220 may also include relative preferences for a quality and a low allowance amount, thus allowing the client 102 to specify preferences regarding potential tradeoffs between the quality and the low allowance amount.

Thus in some embodiments, the allocation administrator 206 of the client 102 selects an allocation option 226 from a plurality of allocation options proposed by data storage resource providers 106. The transaction server 104 may function as an intermediary between the data storage resource providers 106 and the client 102 in such embodiments, and the client 102 may transmit an indication of the selected allocation option 226 to the transaction server for registration with the data manager 108, or the allocation administrator 206 may register the selected allocation option 226 with the data manager 108 directly, or the data storage resource provider 106 may register the selected allocation option 226 with the data manager 108. In other embodiments, the allocation administrator 206 may determine and transmit parameters, specifications, or preferences for selecting an allocation option 226 (e.g., including any of the algorithms, processes, or specifications discussed above) to the transaction server 104, and a request and response manager (RRM) 210 of the transaction server 105 may select an allocation option 226 based on the parameters, specifications, or preferences for selecting an allocation option.

The transaction server 104 includes a processor 208 and an RRM 210. The transaction server may also store, in memory accessible to the RRM 210, one or more requests 212 (e.g., requests 212A through 212N) and one or more responses 214 (e.g., responses 214A through 214N). The transaction server may be configured to function as an intermediary between the data storage resource providers 106 and the client 102, to select allocation options for the client 102, and to register selected allocation options 226 with the data manager 108. In some embodiments, the transaction server 104 may be omitted, the client may communicate directly with the data storage resource providers 106, and the client 102 may perform processes described herein as being performed by the transaction server 104.

The processor 208 may include one or more microprocessors, application-specific integrated circuits (ASICs), a field-programmable gate array (FPGA), etc., or combinations thereof. The processor 208 may be configured to execute firmware, software, and instructions stored in memory (on machine-readable media), such as instructions included in, or accessible to, the components of the transaction server 104 described herein.

The RRM 210 may include logic, hardware, or firmware for managing provisioning requests, for implementing a protocol exchange, and for managing provisioning requests and/or selection of allocation options. The RRM 210 may manage provisioning requests received from the client 102, such as the request 212A. The request 212A may include specifications 216, an initial allowance proposal 218, and option selection preferences 220. An example of at least a portion of a request 212 is shown below:

TABLE 1

| Request for Provisioning | |
| --- | --- |
| Capacity | 100 GB |
| Duration | 10 Days |
| Service Level: | |
| Iops | 10 K |
| BW | 500 MB/sec |
| Latency | <500 usec |
| Tail Latency (95%) | <1 msec |
| Reliability | 2 Drive failure |
| Endurance | 3 DWPD |

Allowance amount: 100

The RRM 210 may receive requests 212 from the client 102. The requests may include, for example, specifications 216, an initial allowance proposal 218, and option selection preferences 220. The specifications 216 may include a capacity or space specification, a quality specification, a timing specification, an allowance specification, or other specifications (e.g. any of the specifications described herein). The requests may include an identification of the client 102, or of the client account associated with the client 102.

The initial allowance proposal 218 may specify an allowance quantity that the client 102 is willing to transfer, have deducted, or otherwise give up from the client account in exchange for provision of data storage resources (e.g. data storage resources satisfying other specifications of the allocation specifications). The initial allowance proposal 216 may be a required allowance amount, and only allocation options matching the required allowance amount (e.g. provisioning data storage resources for the required allowance amount or for an allowance amount greater than the required allowance amount) may be acceptable matches for such an allowance specification. The initial allowance proposal 216 may be a starting point or an input into a matching process that matches the allocation specifications and an allocation option, and the allowance specification may indicate that the initial allowance proposal 216 is not a hard requirement. For example, the specifications 216 or the option selection preferences 220 may indicate that the initial allowance proposal 218 is to be used in an initial request for provisioning.

The option selection preferences 220 may include, for example, reliability preferences regarding reliability of an allocation option. The option selection preferences 220 may indicate a weighting for an allowance amount of the allocation option based on a reliability score. The option selection preferences 220 may also include relative preferences for a quality and a low allowance amount, thus allowing the client 102 to specify preferences regarding potential tradeoffs between the quality and the low allowance amount.

The RRM 210 may receive the request 212A from the client 102 and may transmit at least a portion of the request 212A (e.g., may transmit an indication of any of the specifications 216, the initial allowance proposal 218, or the option selection preferences 220) to one or more data storage resource providers 106. In some embodiments, the transaction server 104 stores the requests 212 in memory, and the data storage resource providers "listen in" for pending requests 212 (e.g., poll the transaction server, periodically or otherwise, about pending requests 212). The RRM 210 may direct the data storage resource providers 106 to an address at which one or more pending requests are accessible, or may otherwise respond to such polling, including transmitting at least a portion of one or more stored requests 212 to the data storage resource providers 106.

The RRM 210 may receive and store in memory one or more responses 214 from the data storage resource providers 106 (e.g., including responses 214A through 214N). The response 214A may indicate a provisioning request that it is responsive to (e.g., may indicate an identification of the request 212A), and may include one or more allocation options 226. The allocation option 226 may include specifications 222, a reliability score 224, and a failure policy 227. In some embodiments, the reliability score 224 and the failure policy 227 may be omitted.

The specifications 222 may include specifications similar to, or the same as, the specifications 216 (e.g., may include a space specification, an allowance specification, a quality specification and/or a timing specification, or other specifications). The specifications 222 may satisfy at least some of the specifications included in the request 212A (e.g., may match at least one of the space specification, the allowance specification, and the quality specification). The specifications 222 may satisfy a portion of the specifications included in the request 212A (e.g., may satisfy a portion of the space specification or of the timing specification). The specifications 222 may specify an allowance amount that matches the initial allowance proposal 218 indicated in the request 212A. The specifications 222 may include an allowance specification that specifies a lowest permissible allowance amount. For example, the lowest permissible allowance amount may indicate a lowest amount a data storage resource provider is willing to accept for specified provisioning. The RRM 210 may use the lowest permissible allowance amount in an allocation selection process described below.

The reliability score 224 may indicate a reliability of the data storage resource provider 106 that furnished the response 214A, a reliability of one or more data nodes to be used in the provisioning, and/or a reliability specific to the proposed provisioning. The reliability may be based on, for example, a historical reliability, or a projected reliability determined by the transaction server 104, the data manager 108, or the data storage resource provider 108 that furnished the response 214A.

The failure policy 227 may specify that if provisioning matching a first set of specifications 222 included in the response 214A cannot or will not be provided, provisioning matching a second set of specifications 222 included in the response 214A may be provided instead. The failure policy 227 may also specify a manner of implementing both sets specifications 222. For example, if failure to meet the first set of specifications 222 occurs partway through a provisioning period specified by a timing specification of the specifications 222, a total allowance amount may be determined to be a sum of (i) the first allowance amount pro-rated for a period during which provisioning matching the first set of specifications 222 was provided, and (ii) the second allowance amount pro-rated for a period during which provisioning matching the second set of specifications 222 was provided. The failure policy 227 may also specify a reduction (e.g., a fixed reduction or a reduction proportionate to a period in which the first set of specifications were not met, relative to a total period of the allocation option 226) that applies should the first set of specifications 222 not be met for the total period of the allocation option 226.

The RRM 210 may perform an allocation option selection process. The RRM 210 may provide, transmit, or disseminate at least a portion the request 212A to the data storage resource providers 106. The RRM 210 may wait a predetermined timeout period for responses from the data storage resource providers 106, or may wait until all or a predetermined number of percentage of the data storage resource providers 106 that have been provided with the at least a portion or the request 212A transmit responses to the transaction server 104.

The RRM 210 may select an allocation option included in the responses 214 received from the data storage resource provides 106. The RRM 210 may select an allocation option (e.g., the allocation option 226) in accordance with the specifications 216. The RRM 210 may select an allocation option based on any of the specifications 222, the reliability score 224, and the failure policy 227. In some embodiments, the RRM 210 selects an allocation option (e.g. that satisfies a minimum space specification) having a lowest allowance amount of the allocation options (e.g. that satisfy the minimum space specification). In some embodiments, the RRM 210 may select multiple allocation options to fulfill a provisioning request (e.g., a single provisioning request). The RRM 210 may select multiple allocation options so as to minimize a total allowance amount, to maximize quality, or to strike a balance therebetween (e.g., based on the option selection preferences 220). For example, the RRM 210 may optionally perform an initial filtering operation on allocation options included in received responses to the provisioning request to filter out allocation options that do not meet a minimum quality specification (in some embodiments, the data storage resource providers 106 may be configured to only send allocation options that meet a minimum quality specified in the provision request, and such filtering by the client 102 may be omitted). The RRM 210 may determine a space-to-allowance ratio for each of the (remaining) allocation options being considered. The RRM 210 may fill the space specification using allocation options having the highest space-to-allowance ratios (e.g., may select a first allocation option having a highest space-to-allowance ratio, may determine whether more space demand remains to be fulfilled, may select a second allocation option having a next highest space-to-allowance ratio, and so on, until the space specification is fulfilled).

In some embodiments, the RRM 210 may determine an initial allowance proposal 218 for the request 212A. For example, the RRM 210 may determine the initial allowance proposal 218 based on a reference space-to-allowance ratio. The RRM 210 may determine the reference space-to-allowance ratio based on one or more historical provisionings (e.g., based on a predetermined number of most recent provisioning). The RRM 210 may determine the reference space-to-allowance ratio based on an average (e.g., a weighted average based on similarity of provisioning specifications) of the historical provisionings. In some embodiments, the RRM 210 may determine the reference space-to-allowance ratio based on open proposals by the data storage resource providers 106 (e.g., that are generally available for fulfilling provisioning requests). In some embodiments, the RRM 210 may determine the reference space-to-allowance ratio based on storage specifications (e.g., may determine a first reference space-to-allowance ratio for a first type of storage (e.g., HDD storage), may determine a second reference space-to-allowance ratio for a second type of storage (e.g., SSD storage), and/or may determine a third reference space-to-allowance ratio for a third type of storage (e.g. RAID-6 SSD storage)).

RRM 210 may select an allocation option of a plurality of allocation options based on a lowest minimum acceptable allowance. For example, if a first response 214A has a first minimum acceptable allowance, and a second response 214B has a second minimum acceptable allowance lower than the first minimum acceptable allowance, the RRM 210 may select the second response 214B. Thus, the client 102 may secure provisioning at a low allowance.

In some embodiments, the RRM 210 may receive responses 214 from the data storage resource providers 106, and may transmit at least a portion of the responses to the client 102 for selection of an allocation option. Prior to or while transmitting the at least a portion of the responses to the client 102, the RRM 210 may perform a filtering process (e.g., a filtering process similar to the filtering process described above). The RRM 210 may receive a selection of the allocation option 226 from the client 102, and may register the selected allocation option 226 with the data manager 108.

The RRM 210 may register selected allocation options 226 with the data manager 108. The RRM 210 may transmit to the data manager 108 a registration request including an identification of the client 102 or an identification of the client account associated with the client 102. For example, the registration request may include at least some of the specifications 222 (and, if applicable, the failure policy 227) of the selection allocation option 226. The RRM 210 may receive an indication from the data storage resource provider 106 that the selected allocation option 226 has been registered, and the RRM may transmit to any of the client 102 and the data storage resource providers 106 an indication of the registration.

In some embodiments, the transaction server 104 may be omitted. In some embodiments, the transaction server 104 may perform certain functions described herein as being performed by the client 102. In various embodiments, any functions described herein as being performed by the client 102 may be performed by the transaction server 104. In various embodiments, any functions described herein as being performed by the transaction server 104 may be performed by the client 102.

The data storage resource provider 106 may include a processor 228, data storage resources 230, a data storage resource profile 232, and an allocation option generator 234. The data storage resource provider 106 may be configured to respond to provisioning requests, to generate allocation options, and to provide read/write access to data storage resources. The data storage resource provider 106 may include one or a plurality of data storage resource providers.

The processor 228 may include one or more microprocessors, application-specific integrated circuits (ASICs), a field-programmable gate array (FPGA), etc., or combinations thereof. The processor 228 may be configured to execute firmware, software, and instructions stored in memory (on machine-readable media), such as instructions included in, or accessible to, the components of the data storage resource provider 106 described herein. The data storage resources 230 may include SSDs, HDDs, and/or other storage media. The data storage resources 230 may include, or may provide access to, data nodes (e.g., volumes, data servers, data blocks, or portions of data blocks) that can be read or written to.

The data storage resource profile 232 may include resources (e.g., maps, tables, libraries, or other reference material) that lists at least some of the data storage resources 230 managed by the data storage resource provider 106, and may include information associated with the data storage resources 230. For example, the data storage resource profile 232 may specify a current or projected state of the data storage resources 230, a current capacity or a projected future capacity, a reliability (e.g. expressed as a reliability score or otherwise), a data storage class or type (e.g., specifying that the data storage resources 230, or a portion of the data storage resources 230, is HDD storage or SSD storage), or other information related to the data storage resources 230.

The allocation option generator 234 may include logic, hardware, or firmware for generating allocation options, and for generating and transmitting responses to provisioning requests to the transaction server 104 or to the client 102. The allocation option generator 234 may receive the request 212A from the transaction server 104, and/or may query or poll the transaction server 104 for a pending request, and may responsively generate the allocation option 226. In some embodiments, the allocation option generator 234 may generate a general allocation option that is not necessarily responsive to a particular request for provisioning, and may publish the allocation option as generally being available (e.g. may publish to the transaction server 104 and/or to the client 102).

The allocation option generator 234 may generate the allocation option 226 as part of the response 214A to the request 212A based on the specifications 216 and the initial allowance proposal 218. The generated allocation option 226 may include specifications 222, a reliability score 224 (in some embodiments, the reliability score is omitted from the allocation option 226 generated by the allocation option generator 234, and may be omitted entirely or may, for example, be determined by the transaction server 104), and, if applicable, a failure policy 227. The allocation option generator 234 may generate any allocation options or sets of allocation options described herein.

The allocation option generator 234 may generate the allocation option 226 to include a proposed allowance amount based on a reference allowance. For example, the proposed allowance amount may be equal to the reference allowance, or may be calculated based on a function of the reference allowance. For example, the allocation option generator 234 may determine the reference allowance based on one or more historical provisionings (e.g., based on a predetermined number of most recent provisioning). The allocation option generator 234 may determine the reference allowance based on an average (e.g., a weighted average based on similarity of provisioning specifications) of the historical provisionings. In some embodiments, the allocation option generator 234 may determine the reference allowance based on open or published proposals by other data storage resource providers 106 (e.g., that are generally available for fulfilling provisioning requests). In some embodiments, the allocation option generator 234 may determine the reference allowance based on storage specifications (e.g., may determine a first reference allowance for a first type of storage (e.g., HDD storage), may determine a second reference allowance for a second type of storage (e.g., SSD storage), and/or may determine a third reference allowance for a third type of storage (e.g. RAID-6 SSD storage)).

The allocation option generator 234 may determine the proposed allowance based on an amount of available space managed by the data storage resource provider 106. For example, the allocation option generator 234 may propose an allowance that is a monotonically decreasing function of the amount of available space.

Figure 5:
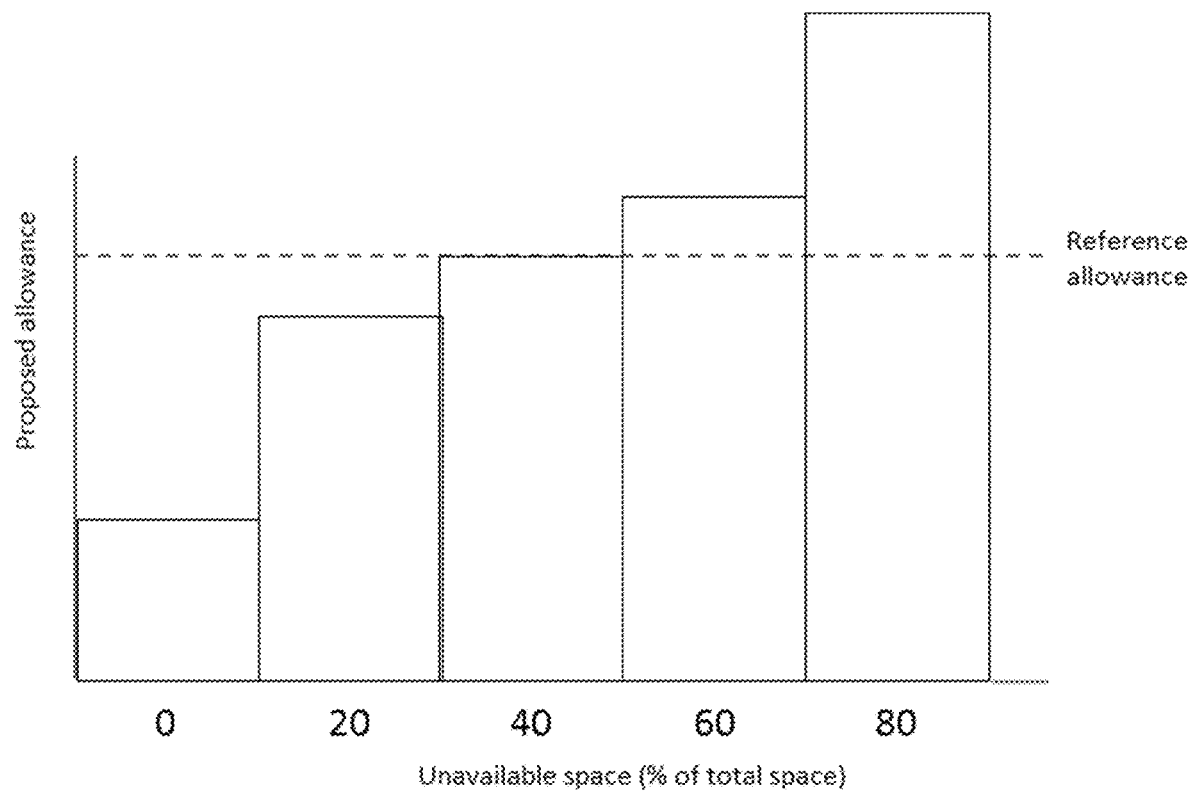
FIG. 5 is a graph illustrating an example method of determining a proposed allowance according to embodiments of the present disclosure.

In some embodiments, the allocation option generator 234 may determine the proposed allowance based on an amount of unavailable space (e.g., occupied or otherwise committed) managed by the data storage resource provider 106 and based on the reference allowance. For example, as shown in FIG. 5, the allocation option generator 234 may propose an allowance that is higher than the reference allowance when the unavailable space is high (e.g., above a predetermined threshold, such as 50% or total space managed by the data storage resource provider 106), and may propose an allowance that is lower than the reference allowance when the unavailable space is low (e.g., below a predetermined threshold, such as 50% or total space managed by the data storage resource provider 106). The proposed allowance need not be linearly related to the amount of unavailable space—for example, as shown in FIG. 5, when the unavailable space is very low (e.g. below 20%), the allocation option generator 234 may determine a disproportionately low proposed allowance. This may help to fill the available space.

In some embodiments, the allocation option generator 234 may be configured to implement a protocol exchange. For example, the allocation option generator 234 may be configured to implement any of the protocol exchange processes or functions that the allocation option administrator 106 is configured to implement, including the processes and functions described herein.

The data manager 108 may include a processor 236, an account manager 238, and a notification administrator 240. The data manager 108 may be configured to register allocation options, thus recording provisioning arrangements between the client 102 and one or more data storage resource providers 106. The data manager 108 may manage an allowance of the client 102, may register the selected allocation option, and may transfer or remove the allowance amount from the client's allowance.

The processor 236 may include one or more microprocessors, application-specific integrated circuits (ASICs), a field-programmable gate array (FPGA), etc., or combinations thereof. The processor 236 may be configured to execute firmware, software, and instructions stored in memory (on machine-readable media), such as instructions included in, or accessible to, the components of the data manager 108 described herein.

The account manager 238 may include logic, hardware, or firmware for managing client accounts. The client account may include an allowance for data storage resources of, or managed by, the data management system 100. The account manager 238 may generate or register the client account responsive to a request from the client 102, may provide an initial allowance for the client account. For example, the account manager 238 may execute or participate in a purchase of the allowance, or an increase in the allowance. The purchase may be executed according to an agreement with the client 102.

The account manager 238 may register selected allocation options for the client account. The account manager 238 may adjust the allowance of the client account based on the registered allocation options (e.g., based on an allowance amount included in a registered allocation option). In some embodiments, the client 102 can request a transfer of allowance from another client 102 (e.g., on a limited time basis, at the end of which the client 102 returns the added allowance), and the account manager 238 may provide for such a transfer.

The account manager 238 may provide for a GUI for managing the client account. For example, the client 102 may use the GUI to log in to or access the client account, which may involve submitting log in credentials. The account manager 238 may verify the log in credentials and provide access to the client account. The GUI can be used to submit requests to the data manager 108 for an adjustment to the allowance. The GUI can be used to manage allocation specifications (e.g. used by the allocation administrator 206 of the client 102).

The notification administrator 240 may include logic, hardware, or firmware for managing notifications. For example, the notification administrator 240 may monitor data nodes or data storage resource providers 106, such as for alarms or alerts, and may notify appropriate parties (e.g., may notify the client 102 regarding a data storage resource provider 106 that is provisioning the client 102). The notification administrator 240 may notify appropriate parties (e.g., any of the client 102, the transaction server 104, and the data storage resource providers 106) of registration of an allocation option.

Thus, the data management system 100 can provide for specific dynamics between the data storage resource providers and one or more clients that avoid bottlenecks experienced in certain comparative systems, and the data management system 100 can readily provision a large number of different applications, virtual machines, containers, or micro-services having different specifications (e.g. involving different capacities, storage classes, quality specifications, and other complexities). Some of those specific dynamics include specific requests for provisioning from the client 102 to the data storage resource providers 106, responses from the data storage resource providers 106 including allocation options 226 specifying an allowance amount, selection of those options, and registering of those options, as well as accounting for the registration via transferring or reducing a client allowance of a client account.

Figure 3:
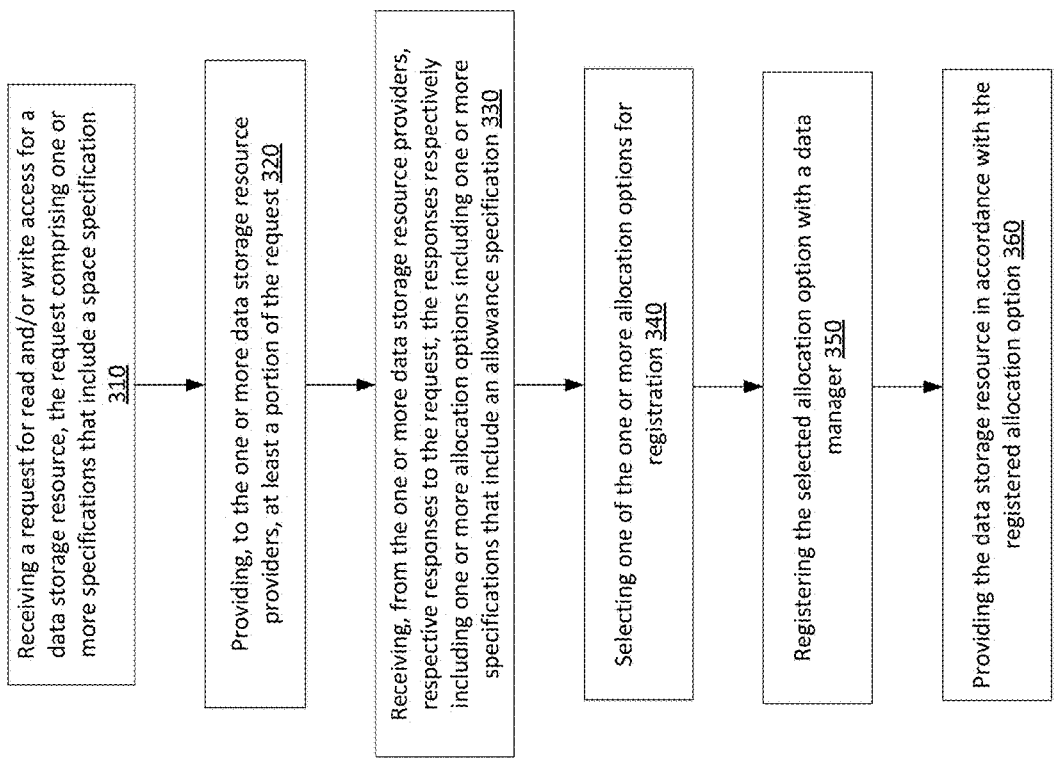
FIG. 3 is a flow chart showing an example method for managing data storage resources according to embodiments of the present disclosure.

FIG. 3 is a flow chart showing an example method for managing data storage resources according to embodiments of the present disclosure. The method includes blocks 310 through 360, and may be implemented using a data management system 100 as described above. As a brief summary, at block 310, the transaction server 104 may receive a request for read and/or write access for a data storage resource, the request including one or more specifications that include a space specification. At block 320, the transaction server 104 may provide, to the one or more data storage resource providers, at least a portion of the request. At block 330, a protocol exchange may be implementing in which the transaction server 104 may receive, from the one or more data storage resource providers, respective responses to the request, the responses respectively including one or more allocation options including one or more specifications that include an allowance specification. At block 340, as part of the protocol exchange, the transaction server 104 may select one of the one or more allocation options for registration. At block 350, the transaction server 104 may register the selected allocation option with a data manager. At block 360, the transaction server 104 may provide the data storage resource in accordance with the registered allocation option.

In more detail, at block 310, the transaction server 104 may receive a request 212A from the client 102 for read and/or write access for a data storage resource, the request 212A. The request 212A may include an identification of the client 102, or of the client account associated with the client 102. The request 212A may include specifications 216, the initial allowance proposal 218, and option selection preferences 220. The specifications 216 may include a capacity or space specification, a quality specification, a timing specification, an allowance specification, or other specifications (e.g., any of the specifications described herein).

The initial allowance proposal 218 may specify an allowance quantity that the client 102 is willing to transfer, have deducted, or otherwise give up from the client account in exchange for provision of data storage resources (e.g. data storage resources satisfying other specifications of the allocation specifications). The initial allowance proposal 216 may be a required allowance amount, and only allocation options matching the required allowance amount (e.g. provisioning data storage resources for the required allowance amount or for an allowance amount greater than the required allowance amount) may be acceptable matches for such an allowance specification. The initial allowance proposal 216 may be a starting point or an input into a matching process that matches the allocation specifications and an allocation option, and the allowance specification may indicate that the initial allowance proposal 216 is not a hard requirement. For example, the specifications 216 or the option selection preferences 220 may indicate that the initial allowance proposal 218 is to be used in an initial request for provisioning.

At block 320, the transaction server 104 may provide, to the one or more data storage resource providers 106, at least a portion of the request 212A. In some embodiments, the transaction server 104 stores the request 212A in memory, and the data storage resource providers 106 may "listen in" for pending requests (e.g., poll the transaction server, periodically or otherwise, about pending requests). The RRM 210 of the transaction server 104 may direct the data storage resource providers 106 to an address at which one or more pending requests are accessible, or may otherwise respond to such polling, including providing at least a portion of one or more stored requests 212. In some embodiments, the RRM 210 transmits at least a portion of the request to the data storage resource providers 106.

At block 330, the transaction server 104 may receive, from the one or more data storage resource providers 106, respective responses 214 to the request 212A. One of the responses may be the response 214A which includes the allocation option 226. The allocation option 226 may include specifications 222, a reliability score 224, and a failure policy 227. In some embodiments, the reliability score 224 and the failure policy 227 may be omitted.

The specifications 222 may include specifications similar to, or the same as, the specifications 216 (e.g., may include a space specification, an allowance specification, a quality specification and/or a timing specification, or other specifications). The specifications 222 may satisfy at least some of the specifications included in the request 212A (e.g., may match at least one of the space specification, the allowance specification, and the quality specification). The specifications 222 may satisfy a portion of the specifications included in the request 212A (e.g., may satisfy a portion of the space specification or of the timing specification). The specifications 222 may specify an allowance amount that matches the initial allowance proposal 218 indicated in the request 212A.

The reliability score 224 may indicate a reliability of the data storage resource provider 106 that furnished the response 214A, a reliability of one or more data nodes to be used in the provisioning, and/or a reliability specific to the proposed provisioning. The reliability may be based on, for example, a historical reliability, or a projected reliability determined by the transaction server 104, the data manager 108, or the data storage resource provider 108 that furnished the response 214A. The failure policy 227 may specify that if provisioning matching a first set of specifications 222 included in the response 214A cannot or will not be provided, provisioning matching a second set of specifications 222 included in the response 214A may be provided instead. The failure policy 227 may also specify a manner of implementing both sets specifications 222.

At block 340, the RRM 210 may select one of the one or more received allocation options included in the responses 214 for registration with the data manager 108. The RRM 210 may select an allocation option (e.g., the allocation option 226) in accordance with the specifications 216. The RRM 210 may select an allocation option based on any of the specifications 222, the reliability score 224, and the failure policy 227. In some embodiments, the RRM 210 selects an allocation option (e.g. that satisfies a minimum space specification) having a lowest allowance amount of the allocation options (e.g. that satisfy the minimum space specification). In some embodiments, the RRM 210 may select multiple allocation options to fulfill a provisioning request (e.g., a single provisioning request). The RRM 210 may select multiple allocation options so as to minimize a total allowance amount, to maximize quality, or to strike a balance therebetween (e.g., based on the option selection preferences 220).

At block 350, the RRM 210 may register the selected allocation option 226 with the data manager 108. The RRM 210 may transmit to the data manager 108 a registration request including an identification of the client 102 or an identification of the client account associated with the client 102. For example, the registration request may include at least some of the specifications 222 (and, if applicable, the failure policy 227) of the selection allocation option 226. The RRM 210 may receive an indication from the data storage resource provider 106 that the selected allocation option 226 has been registered, and the RRM may transmit to any of the client 102 and the data storage resource providers 106 an indication of the registration. In other embodiments, the client 102 or the data storage resource provider 106 may register the selected allocation option 226 with the data manager 108.

At block 360, the data storage resource provider 106 may provide the data storage resource in accordance with the registered allocation option 226. For example, the data storage resource provider 106 may provide read/write access to the client 102 for a storage node managed by the data storage resource provider 106. The access may be in accordance with specifications of the allocation option 226 (e.g., quality specifications or timing specifications).

Thus, the data management system 100 may provide for data management in a manner that avoid bottlenecks experienced in certain comparative systems, and that can readily handle a large number of different applications, virtual machines, containers, or micro-services having different specifications.

Figure 4:
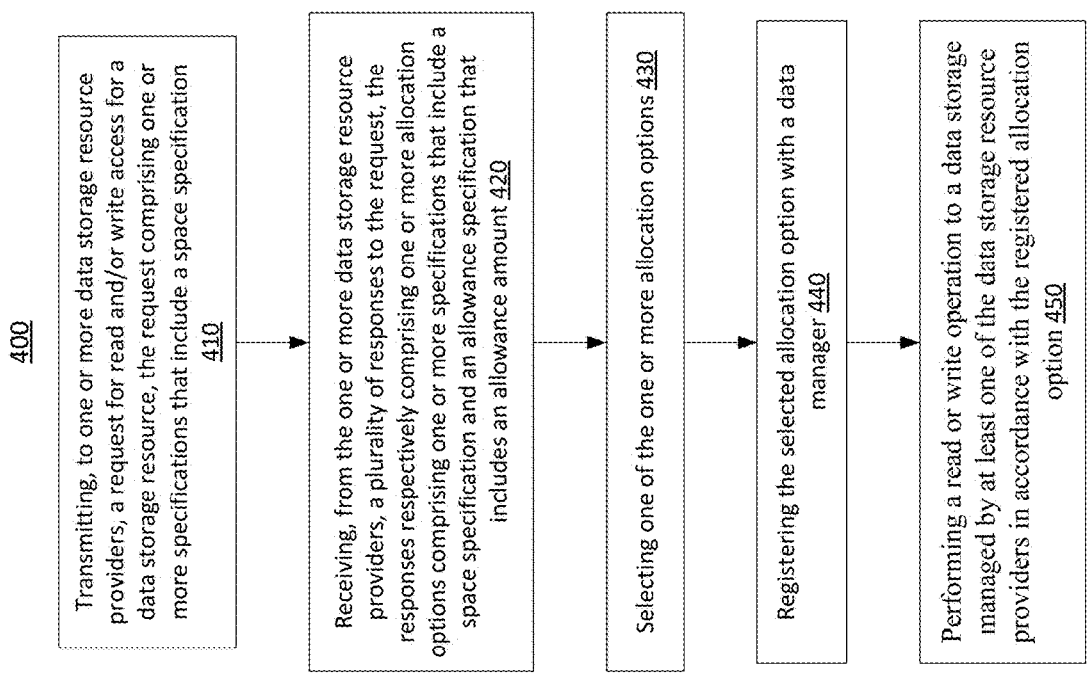
FIG. 4 is a flow chart showing an example method for managing data storage resources according to embodiments of the present disclosure.

FIG. 4 is a flow chart showing an example method for managing data storage resources according to embodiments of the present disclosure. The method includes blocks 410 through 450, and may be implemented using a data management system 100 as described above. As a brief summary, at block 410, the client 102 may transmit, to one or more data storage resource providers, a request for read and/or write access for a data storage resource, the request including one or more specifications that include a space specification. At block 420, as part of a protocol exchange, the client 102 may receive, from the one or more data storage resource providers, a plurality of responses to the request, the responses respectively including one or more allocation options including one or more specifications that include a space specification and an allowance specification that includes an allowance amount. At block 430, the client 102 may select one of the one or more allocation options. At block 440, the client 102 may register the selected allocation option with the data manager 108. At block 450, the client 102 may perform a read or write operation to a data storage managed by at least one of the data storage resource providers in accordance with the registered allocation option.

In more detail, at block 410, the client 102 may transmit, to one or more data storage resource providers 106, the request 212A. The request 212A may include specifications 216, the initial allowance proposal 218, and option selection preferences 220. The specifications 216 may include a capacity or space specification, a quality specification, a timing specification, an allowance specification, or other specifications (e.g. any of the specifications described herein).

At block 420, the client 102 may receive, from the one or more data storage resource providers 106, a plurality of responses 214A to the request, the responses 214A respectively including one or more allocation options 226 including one or more specifications 222 that include a space specification and an allowance specification that includes an allowance amount. The client 102 may, for example, receive the responses 214A directly from the data storage resource providers 106, or may receive the responses 214A via the transaction server 104.

At block 430, the allocation option manager 206 may select one of the one or more allocation options 226. The allocation administrator 206 may select an allocation option 226 based on the allocation specifications 222. In some embodiments, the allocation administrator 206 selects an allocation option 226 (e.g. that satisfies a minimum space specification) having a lowest allowance amount of the allocation options 226 (e.g. that satisfy a minimum space specification). In some embodiments, the allocation administrator 206 may select multiple allocation options to fulfill a provisioning request (e.g., a single provisioning request). The allocation administrator 206 may select multiple allocation options 226 so as to minimize a total allowance amount, to maximize quality, or to strike a balance therebetween.

At block 440, the account manager 204 of the client 102 may register the selected allocation option 226 with the data manager 108. The account manager 204 may register the selected allocation option 226 with the data manager 108 directly or indirectly (e.g., via a transaction server 104). The account manager 204 may use a GUI to register the selected allocation option 226 with the data manager 108. In other embodiments, the data storage resource provider 106 may register the selected allocation option 226 with the data manager 108.

At block 450, the data management system 100 may perform a read or write operation to a data storage managed by at least one of the data storage resource providers in accordance with the registered allocation option. For example, the client 102 may transmit a read/write request for a storage node managed by the data storage resource provider 106. This access to the storage node may be in accordance with specifications of the selected allocation option 226 (e.g., quality specifications or timing specifications).

Thus, the data management system 100 may provide for decentralized data management in an efficient manner that can account for some of the complexities discussed herein.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. A resource management system in a data center, comprising:
   a plurality of data storage resource providers configured to provide access to respective amounts of data storage; and
   a transaction server configured to:
      receive, from a client, a request for read and/or write access for a data storage resource, the request comprising one or more specifications that include a space specification of the data storage resource;
      provide, to the plurality of data storage resource providers, at least a portion of the request;
      receive, from the plurality of data storage resource providers, respective responses to the request, the responses respectively comprising a plurality of allocation options comprising one or more specifications that include an allowance specification for meeting the requested space specification based on the respective amounts of data storage;
      select, from among the responses received from the data storage resource providers, one of the plurality of allocation options for registration; and
      register the selected allocation option with a data manager,
   wherein at least one of the plurality of data storage providers is configured to provide the client with read and/or write access for the data storage resource in accordance with the registered allocation option.

2. The resource management system of claim 1, wherein the specifications included in the request comprise an initial allowance proposal that specifies an allowance amount, and the allowance specifications included in the plurality of allocation options specify an allowance amount that matches the allowance amount of the initial allowance proposal.

3. The resource management system of claim 2, further comprising the data manger, wherein:
registering the selected allocation option with the data manager comprises transmitting a registration request indicating the specifications of the selected allocation option; and
the data manager is configured to:
receive the registration request from the transaction server; and
update an allowance for the client based on the allowance amount specified by the selected allocation option.

4. The resource management system of claim 1, wherein the specifications included in the request comprise a quality specification including at least one of a service level agreement or a quality of service specification.

5. The resource management system of claim 4, wherein the specifications included in the plurality of allocation options of each of the responses include a quality specification based on the quality specification included in the request.

6. The resource management system of claim 4, wherein at least one of the responses includes a first allocation option and a second allocation option, the first allocation option including a first proposed allowance and a first proposed quality, the second allocation option including a second proposed allowance different from the first proposed allowance, and a second proposed quality different from the first proposed quality.

7. The resource management system of claim 4, wherein at least one of the responses includes a first allocation option and a second allocation option, and the response further includes a failure policy specifying that the second allocation option is to be implemented when the first allocation option fails.

8. The resource management system of claim 7, wherein the first allocation option comprises a first allowance specification and a first quality specification, the second allocation option comprises a second allowance specification lower than the first allowance specification, and the failure policy specifies that the first allocation option fails at least when the first quality specification is not met.

9. The resource management system of claim 8, wherein the specifications included in the request comprise an initial allowance proposal, and the first allowance specification matches the initial allowance proposal.

10. The resource management system of claim 1, wherein the transaction server is further configured to transmit an indication of the selected response to the client.

11. The resource management system of claim 1, wherein the transaction server is further configured to transmit an indication of two or more of the responses to the client, to receive a selection response from the client, and to select the response for registration based on the selection response from the client.

12. A data storage resource management system, comprising:
a data manager configured to register allocation specifications; and
a plurality of data storage resource providers configured to provide access to respective amounts of data storage, wherein each of the plurality of data storage resource providers is configured to:
receive, from a client, a request for read and/or write access for a data storage resource managed by the data storage resource provider, the request comprising one or more specifications that include a space specification of the data storage resource;
provide, to the client, a response to the request, the response comprising one or more allocation options comprising one or more specifications that include an allowance specification for meeting the requested space specification based on the respective amounts of data storage;
receive, from the data manager, an indication that at least one of the one or more allocation options selected from among a plurality of responses respectively provided by the plurality of data storage resource providers has been registered; and
provide the client with read and/or write access for the data storage resource in accordance with the registered allocation option.

13. The resource management system of claim 12, wherein the specifications included in the request comprise an initial allowance proposal that specifies an allowance amount, and the allowance specifications included in the one or more allocation options specify an allowance amount that matches the allowance amount of the initial allowance proposal.

14. The data storage resource management system of claim 12, wherein the one or more specifications of the request comprise a timing specification that specifies an expiration time or a validity timeframe.

15. The data storage resource management system of claim 12, wherein the data manager is configured to receive a selected allocation option from the client, to register the selected allocation option, and to update an account associated with the client based on the selected allocation option.

16. A method of managing data storage resources, comprising:
transmitting, by a client device to a plurality of data storage resource providers configured to provide access to respective amounts of data storage, a request for read and/or write access for a data storage resource, the request comprising one or more specifications that include a space specification of the data storage resource;
receiving, by the client device from the plurality of data storage resource providers, a plurality of responses to the request, the responses respectively comprising a plurality of allocation options comprising one or more specifications that include an allowance specification that includes an allowance amount for meeting the requested space specification based on the respective amounts of data storage;
selecting, by the client device from among the responses received from the data storage resource providers, one of the plurality of allocation options;
registering, by the client device, the selected allocation option with a data manager; and
providing the client device with read and/or write access to the data storage resource managed by at least one of the data storage resource providers in accordance with the registered allocation option.

17. The method of claim 16, wherein selecting the one of the plurality of allocation options comprises selecting, from amongst the plurality of responses, an allocation option having a lowest allowance amount.

18. The method of claim 16, wherein selecting the one of the plurality of allocation options comprises:

determining a space-to-allowance ratio for each of the allocation options included in at least some of the plurality of responses based on the allowance specification and the space specification;

selecting a plurality of allocation options to meet the space specification of the request based on the determined space-to-allowance ratios.

19. The method of claim 16, further comprising logging in to a client account via the data manager, the account associated with an allowance.

20. The method of claim 19, further comprising receiving, by the client device, an indication from the data manager that the allowance has been changed based on the selected allocation option.

* * * * *